United States Patent [19]

Cornelison

[11] 4,416,157

[45] Nov. 22, 1983

[54] INCLINED MANOMETER

[75] Inventor: Richard C. Cornelison, Hiram, Ohio

[73] Assignee: Condar Co., Hiram, Ohio

[21] Appl. No.: 292,503

[22] Filed: Aug. 13, 1981

[51] Int. Cl.³ .............................................. G01L 7/18
[52] U.S. Cl. ..................................................... 73/747
[58] Field of Search ............ 73/747, 749, 750, 861.46, 73/861.49, 189

[56] References Cited

U.S. PATENT DOCUMENTS 1,273,590  7/1918  Ellison .................................. 73/747
1,361,142  12/1970  Cook ..................................... 73/747
2,257,577  9/1941  Rosenberger ..................... 73/861.49

OTHER PUBLICATIONS

"The Manometer and Its Uses", J. B. Meriam, 9–1941, p. 18.

Primary Examiner—Donald O. Woodiel

Attorney, Agent, or Firm—Fay & Sharpe

[57] ABSTRACT

An inclined manometer particularly adapted for gauging the draft of a stove flue pipe is provided. The manometer is comprised of a pair of opposed open-ended legs mounted on a mounting plate. The legs are inclined at a relatively large angle from each other and are integrally joined at a midpoint nadir including an indenting recess. One terminal end of a first of the legs is received inside the flue pipe and a second terminal end of a second of the legs is opened to the ambient environment outside the flue pipe. The mounting plate includes a registry for identifying pressure differentials between the terminal ends. A selectively adjustable mounting bracket is employed for mounting the mounting plate to the flue pipe and for selectively leveling the manometer legs. A manometer fluid is provided consisting of ninety to ninety-seven percent propylene glycol and three to ten percent water with a trace of dye material.

11 Claims, 6 Drawing Figures

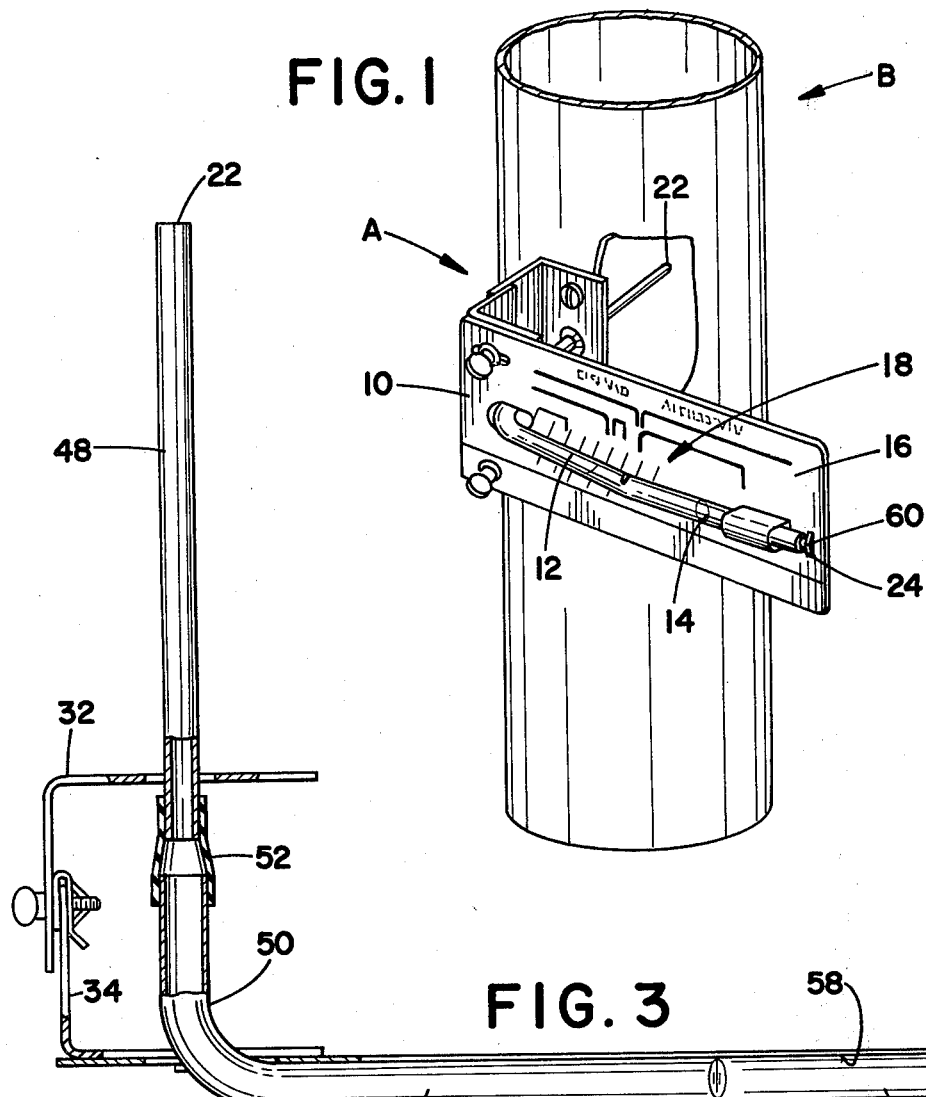

INCLINED MANOMETER

BACKGROUND OF THE INVENTION

This invention pertains to the art of pressure sensing devices and, more particularly, to a device for identifying pressure differentials.

The invention is particularly applicable to a draft gauge for identifying the draft pressure of a stove or furnace flue pipe. However, it will be appreciated to those skilled in the art that the invention could be readily adapted for use in other environments as, for example, where similar pressure sensing devices are employed for sensing pressure differential.

As energy costs have risen, an increased need has arisen for instruments indicating the operational characteristics of stoves and furnaces. It is particularly important in solid fuel stoves or furnaces that the burning wood or coal be exposed to a proper draft for maximizing burning efficiency. Draft is caused by a pressure differential between the pressure in the flue pipe and the pressure outside of the flue pipe in the room of the burning stove.

It is well known that liquid manometers may be employed for gauging small pressure differentials. Conventional manometers typically comprise a U-shaped tube, one end of which is open to the atmosphere, and the other to the region where the pressure is to be measured. If the pressure is different from atmospheric, the liquid with which the manometer is partially filled with stand higher in one leg of the tube than the other. It is also conventionally known that to make the instrument more sensitive, both legs may be inclined so that a given vertical displacement of the meniscus in one leg relative to the other will travel a considerably larger distance along the scale.

Prior differential manometers have suffered from a number of inherent problems, foremost of which is that most differential manometers have not been designed for use in the home and, specifically, the living area and therefore typically comprise excessively large, unwieldy, aesthetically unattractive and expensively produced devices. In particular, most prior differential manometers which could be employed on a flue pipe would be so large as to be impractical for home use. Those differential manometers which would be sufficiently compact to be practically employed in a home have suffered from high price and the problem of having a tube bore so small that flammable gauge oil with low surface tension had to be employed or else the meniscus would lack sufficient sensitivity to the relevant changes in pressure of a flue pipe.

Another particular problem with prior art differential manometers has been the use of a manometer fluid which could be exposed to the high temperatures of a stove flue pipe and, yet, resist evaporation while maintaining thermal stability so as to be practically useful for an advantageous period of time.

A further problem with prior art differential manometers has been lack of an economical leveling mechanism to be used for maximizing draft gauging efficiency in a compact manometer tube. In differential manometers that have not been open ended, it has not been particularly critical to maintain leveling for efficient operation.

The present invention contemplates a new and improved device which overcomes all of the above-referred to problems. The new differential manometer is reliable, simple in design, economical to manufacture, readily adaptable for use with a stove or furnace in a home living area or basement, easy to install, easy to adjust and employ, and provides improved draft gauging and ease of reading.

BRIEF SUMMARY OF THE INVENTION

In accordance with the present invention, there is provided a manometer for gauging the draft of a flue pipe comprising an opposed pair of inclined manometer legs, one of the legs having a first open-ended terminal end and a second of the legs having a second open-ended terminal end. Each of the legs is inclined at a relatively large angle from the other and integrally joined at a midpoint nadir which includes a recess. A mounting plate is provided for mounting the pair of legs and includes indicia for identifying pressure differential between the first terminal end and the second terminal end. The first terminal end is adapted to be received in the flue pipe and the second terminal end is opened to the surrounding or ambient environment of the flue pipe.

In accordance with another aspect of the present invention, the mounting plate is attached to a mounting bracket which together include means for selectively leveling the manometer legs. The mounting bracket comprises a pair of opposed right angle brackets which are fastened together. A first of the brackets includes means for fastening the pair to the flue pipe and also includes an aperture for receiving a terminal end portion of the first manometer leg. The first open-ended terminal end of the first leg is received in the flue pipe. A second of the brackets is fastened to the mounting plate. The means for selectively leveling comprises a threaded member received in a slot through the mounting plate and threadedly received in the mounting bracket whereby upon loosening of the threaded member from the mounting bracket, the mounting plate is free for selective adjustment. Upon tightening of the threaded member to the mounting bracket, the mounting plate is secured to the mounting bracket.

In accordance with the present invention, there is provided a fluid for reception in an open ended manometer essentially consisting of 93–97% propylene glycol and 3–7% water.

In accordance with a further aspect of the present invention, the fluid includes a trace of dye material.

In accordance with the present invention, there is provided a draft gauge for identifying pressure differential comprising a first and a second open ended leg having a cross-sectional internal diameter falling within the range of 0.19" to 0.25", each of the legs having an inclined angle of 4.5° or more. A mounting plate is provided which includes a meniscus registry and is securely attached to the first and the second legs.

One benefit obtained by use of the present invention is a draft gauge for identifying differential pressure between a flue pipe and its environment.

Another benefit obtained from the present invention is a draft gauge which is sufficiently compact and aesthetically pleasing for use in a home living environment.

A further benefit of the present invention is a manometer fluid for use in an open ended manometer which resists evaporation, is not flammable or explosive and exhibits thermal stability in a relatively high temperature environment.

Yet another benefit of the present invention is a draft gauge for use on a home flue pipe with a minimum compact size for maximum efficiency and pressure sensitivity.

Yet another benefit of the present invention is a draft gauge for use in a home application including an improved leveling mechanism for maximizing operational efficiency of the draft gauge.

Other benefits and advantages for the subject new inclined manometer will become apparent to those skilled in the art upon a reading and understanding of this specification.

BRIEF DESCRIPTION OF THE DRAWINGS

The invention may take physical form in certain parts and arrangement of parts, the preferred embodiment of which will be described in detail in this specification and illustrated in the accompanying drawings which form a part hereof and wherein:

FIG. 1 is a perspective view of an inclined manometer or draft gauge formed in accordance with the present invention showing it in position on a flue pipe, or the like;

FIG. 2 is an enlarged, elevational view of the invention;

FIG. 3 is a top plan view of the invention shown in FIG. 2;

FIG. 6 is an exploded perspective view illustrating the mounting brackets and mounting plate portions of the invention for attachment to a flue pipe or the like.

DETAILED DESCRIPTION OF THE INVENTION

Figures 4, 5:
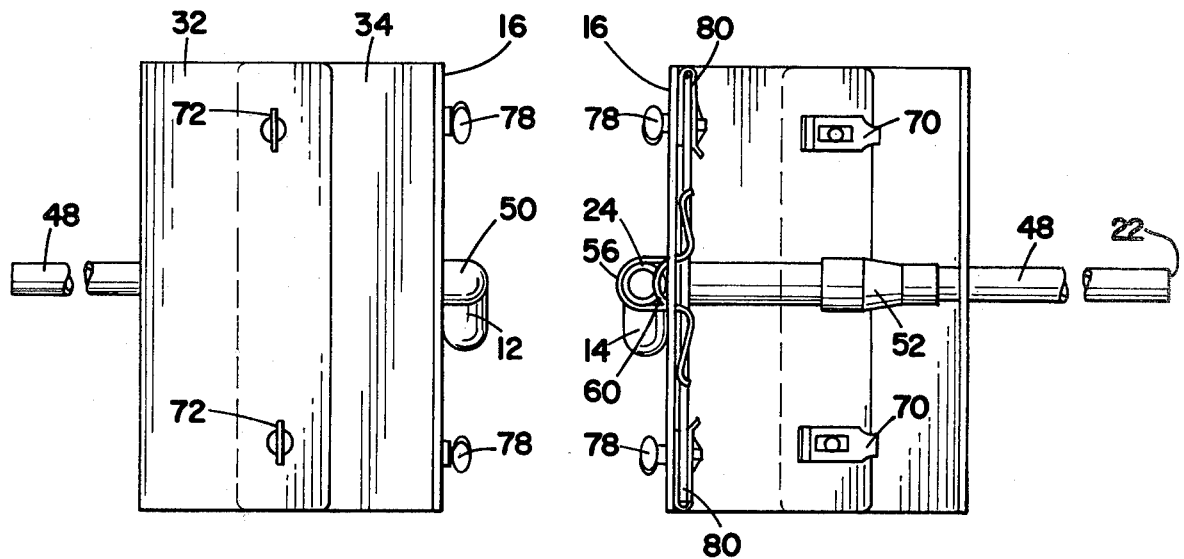
FIG. 4 is an end elevational view taken along line 4—4 of FIG. 2.
FIG. 5 is an end elevational view taken along line 5—5 of FIG. 2.

Referring now to the drawings wherein the showings are for purposes of illustrating the preferred embodiment of the invention only and not for purposes of limiting same, the FIGURES show a draft gauge A mounted on a flue pipe or the like generally designated B.

More specifically and with reference to FIGS. 1, 2 and 3, draft gauge A comprises an inclined manometer 10 including an opposed pair of inclined manometer legs comprising a first manometer leg 12 and a second manometer leg 14 mounted on a mounting member or plate 16 including a meniscus registry 18. FIrst leg 12 has a first open-ended terminal end 22 (FIG. 3), and second leg 14 has a second open-ended terminal end 24. A manometer fluid 26 is contained in the legs 12, 14 and includes a first meniscus 28 and a second meniscus 30 (FIG. 2). Mounting plate 16 is attached to flue pipe A with a mounting bracket preferably comprised of first right angle mounting bracket 32 and second right angle mounting bracket 34.

Manometer legs 12, 14 preferably comprise glass tubes inclined at a relatively large angle from each other and at least 5° from the horizontal (FIG. 3). Legs 12, 14 are integrally joined at a midpoint nadir 40. Although glass tubes are preferably employed, it is within the scope of the invention to include tubes of alternate construction which may operate to provide the identity of the location of first meniscus 28 relative to the meniscus registry 18. Since the invention is contemplated for primary use in the home and, specifically, living areas of the home, it is important that the construction be as compact as possible while maintaining an aesthetically pleasing appearance. Compactness is realized by reducing leg length and maintaining bore within specific limits. However, experimental testing has proven that optimum bore size is 0.220" inner diameter. An inner diameter of 0.250" results in excessively long legs. An inner tube diameter smaller than 0.190" lacks sufficient sensitivity because of liquid tension with the nonflammable liquids employed. Concerning the angle of incline C, it has been found that an angle above 6° from the horizontal has insufficient scale length for the intended use, whereas an angle of less than 4.5° from the horizontal is too sensitive and similarly to a large diameter tube, the necessary operational length is excessive.

In the preferred embodiment of the invention, an inclined angle of $5\frac{1}{4}°$ of each leg from the horizontal in combination with a leg inner diameter of 0.220" is advantageously employed.

It is another particular feature of the invention that a midpoint, indenting recess 42 on the upper tube wall surface of legs 12, 14 at nadir 40 be employed for effectively increasing the operational length of legs 12, 14. Recess 42 effectively causes the liquid at the point of the recess 42 to be displaced to the extent of the volume of the recess, which operates to allow the scale to be compressed in proportion to the depth of the recess. Recess 42 preferably comprises an indentation in the upper wall at the midpoint nadir 40 but it is within the scope of the invention to provide an alternate volume consuming item at the midpoint nadir for purposes of reducing the depth of the manometer fluid 26 at that point. In the preferred embodiment of the invention, meniscus registry 18 gauges the pressure at first terminal end 22 in a scale of inches of water ranging from 0.30" to −0.1". Without recess 42, given the preferred leg angle of incline and bore diameter, and subject to the normal differential pressures of a flue pipe, meniscus registry 18 would have to be extended at least an additional 0.25" of water which would require an excessively long length for both legs and excessive size for the whole instrument.

First terminal end 22 is preferably inserted into flue pipe B through an aperture provided in the sidewall of the flue pipe for exposure to the ambient pressure of the flue pipe. The first leg terminal end portion 48 is disposed for at least partial insertion into the flue pipe B and is preferably constructed of a rugged, durable and preferably thermally stable material such as stainless steel. First leg terminal end portion 48 is joined to an arcuate intermediate portion 50 (FIG. 3) of first leg 12 with an elastomeric, high temperature, pressure sealing sleeve 52 which operates to fasten terminal end portion 48 to first leg 12 and communicate the pressure a first terminal end 20 to the first leg 12. It is within the scope of the present invention that first leg terminal end portion 48 be integral with first leg arcuate intermediate portion 50 such that the connecting sleeve 52 would be obviated. Arcuate portion 50 comprises a generally 90° bend in the first leg 12 depending toward the generally straight terminal end portion 48.

Figure 6:
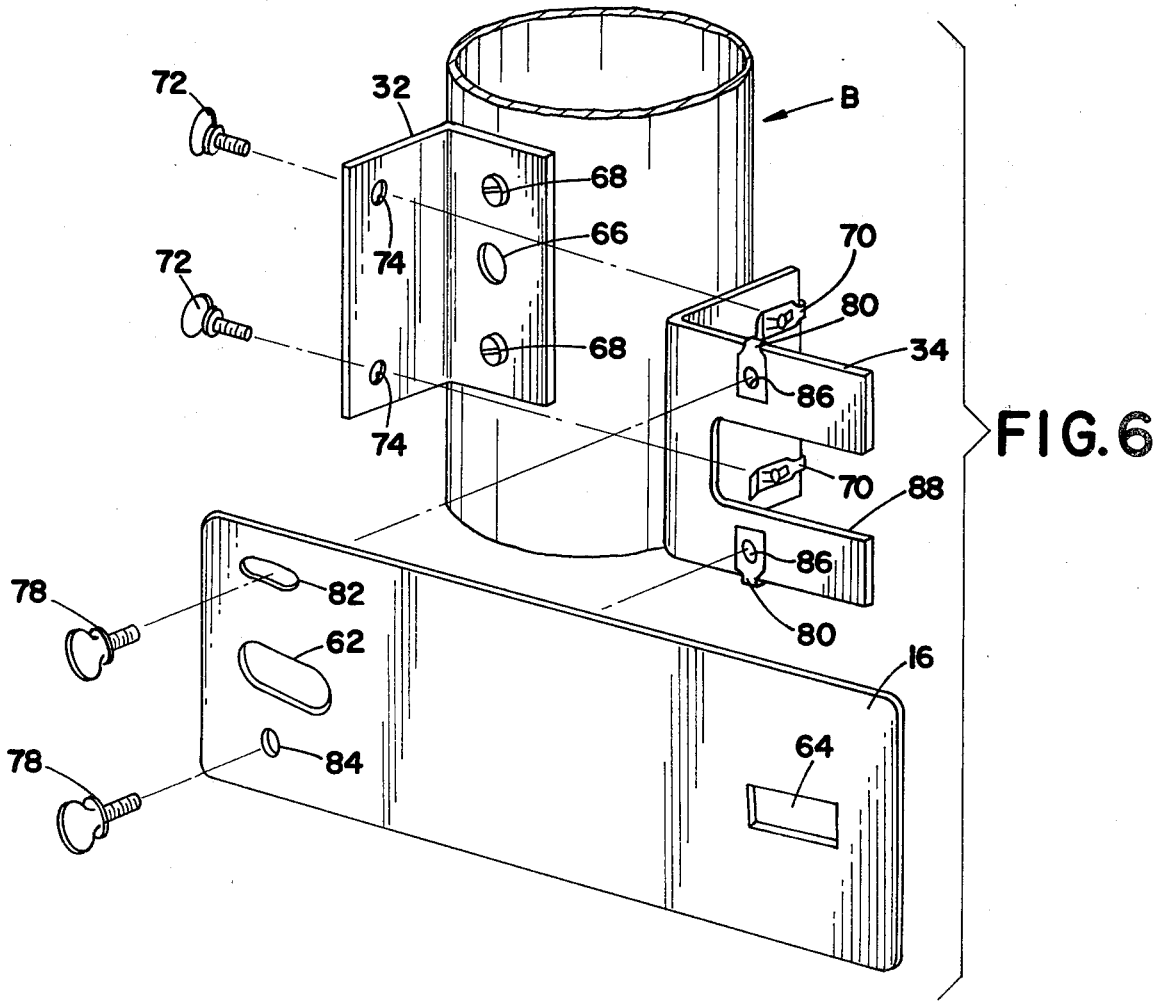

First and second legs 12, 14 are securely mounted to mounting plate 16 with a spring clip 56 closely confining legs 12, 14 against mounting plate front face 58. A normally extending protrusion 60 from the plate front face 58 abuts the second terminal end 24 of second leg 14 while arcuate, intermediate portion 50 extends through mounting plate 16 at a first leg receiving slot 62 which abuts the arcuate intermediate portion 50 on the first leg outer sidewall surface to confine legs 12, 14 against axial movement within spring clip 56. In addition, the inclined nature of first and second legs 12, 14 in combination with close abutment against the mounting plate front surface 58 prevents twisting of the legs when fastened to the mounting plate 16. Spring clip 56 is received in a spring clip receiving slot 64 (FIG. 6).

Before advantageous use of the subject inclined manometer 10, the manometer must be successfully mounted to flue pipe B. With reference to FIGS. 4, 5 and 6, mounting plate 16 is attached to the flue pipe B with first and second mounting brackets 32, 34. First mounting bracket 32 is securely fastened to flue pipe B with conventional fasteners such as threaded metal screws 68 and includes an aperture 70 aligned with an aperture in the sidewall of the flue pipe B for receiving the first leg terminal end portion 48 and terminal end 22. Bracket 32 is preferably a right angle bracket which, in turn, is fastened to second mounting bracket 34 which preferably is also a right angle bracket. Conventional fastener devices such as Tinnerman fasteners or speed nuts 70 in combination with wing bolts 72 may be advantageously employed for fastening purposes. Fastener apertures 74 of first bracket 32 and apertures 76 of second bracket 34 are configured for close reception of wing bolt 72 and are aligned such that after reception of bolts 72 in apertures 74, 76, second mounting bracket 34 and first mounting bracket 32 are generally fixed against rotational movement relative to each other and after tightening of bolts 72 in nuts 70, first mounting bracket 32 is securely fastened to second mounting bracket 34. Mounting plate 16 is similarly fastened to second mounting bracket 34 with conventional fasteners such as wing bolts 78 and speed nuts 80. However, preferably, at least one of the mounting plate fastener receiving apertures comprises a slot 82 (FIG. 6) such that when wing bolts 78 are received in slot 82, in the remaining fastener aperture 84 of mounting plate 16, and in the aligned fastener apertures 86 of second mounting bracket 34, and while the fasteners 78 remain untightened in speed nuts 86, mounting plate 16 may be pivoted for selective adjustment for leveling. Second mounting bracket 34 includes a central opening 88 aligned with first leg receiving slot 62 and flue pipe access opening 66 to provide for movement of arcuate intermediate portion 50 of first leg 12 during selective adjustment.

Leveling of the inclined manometer 10 is accomplished with the use of a first liquid level mark 94 and a second liquid level mark 96 indicated on mounting plate front face 58 (FIG. 1). The proper amount of fluid is present in the legs 12 and 14 and the manometer 10 is leveled when the meniscii 28, 30 are positioned at the liquid level marks 94, 96 as is indicated in FIG. 2.

Since the subject invention is intended to be employed with a stove flue pipe B which reaches temperatures in excess of 212° F., it is necessary to employ a manometer fluid 26 which is both thermally stable, resistant to evaporation and non-flammable. Although propylene glycol is well known as a manometer fluid, it was found that pure propylene glycol suffered from such excessive thermal expansion as to be impractical for use with the draft gauge. Further, it was found that at less than 93% propylene glycol the evaporation was excessive at elevated temperatures. Laboratory testing established that a manometer fluid 26 consisting of 93-97% propylene glycol and 3-7% water was operationally useful with the present invention. Preferably, however, manometer fluid 26 consists of 95% propylene glycol and 5% water. In addition, a trace of dye material such as a red dye is advantageously employed for ease of reading the mensecii against registry 18.

In operation, the invention may be employed for identifying the differential pressure between a flue pipe and the atmosphere for identifying a flue pipe draft. The invention has been described with reference to the preferred embodiment. Obviously, modifications and alterations will occur to others upon a reading and understanding of the specification. It is my intention to include all such modifications and alterations insofar as they come within the scope of the appended claims or the equivalents thereof.

What is claimed is:

1. A manometer for gauging the draft of a flue pipe comprising:
    an opposed pair of inclined manometer legs, one of said legs having a first open-ended terminal end and a second of said legs having a second open-ended terminal end, each of said legs being inclined at a relatively large angle and being integrally joined at a midpoint nadir, said nadir including a recess; and,
    a mounting plate for mounting said pair of legs, said plate including a gauge for identifying pressure differential between said first terminal end and said second terminal end and wherein said first terminal end is adapted to be received in said flue pipe and said second terminal end is opened to the environment of said flue pipe;
    said mounting plate being attached to a mounting bracket and including means for selectively leveling said manometer legs;
    said mounting bracket comprising a pair of opposed right angle brackets, said pair being fastened together, a first of said brackets including means for fastening said pair to said flue pipe and including an aperture for receiving a terminal end portion of said first manometer legs, said first open-ended terminal end being received in said flue pipe and a second of said brackets being fastened to said mounting plate.

2. A manometer for gauging the draft of a flue pipe comprising:
    an opposed pair of inclined manometer legs, one of said legs having a first open-ended terminal end and a second of said legs having a second open-ended terminal end, each of said legs being inclined at a relatively large angle and being integrally joined at a midpoint nadir, said nadir including a recess;
    a mounting plate for mounting said pair of legs, said plate including a gauge for identifying pressure differential between said first terminal end and said second terminal end and wherein said first terminal end is adapted to be received in said flue pipe and said second terminal end is opened to the environment of said flue pipe;
    said mounting plate being attached to a mounting bracket and including means for selectively leveling said manometer legs;
    said means for selectively leveling comprising a threaded member received in a slot of said mounting plate and threadedly received in said mounting bracket whereby upon loosening of said threaded member from said mounting bracket, said mounting plate is freed for selective adjustment and upon tightening of said threaded member to said mounting bracket, said mounting plate is secured to said mounting bracket.

3. A manometer for gauging the draft of a flue pipe comprising:
an opposed pair of inclined manometer legs, one of said legs having a first open-ended terminal end and a second of said legs having a second open-ended terminal end, each of said legs being inclined at a relatively large angle and being integrally joined at a midpoint nadir, said nadir including a recess;
a mounting plate for mounting said pair of legs, said plate including a gauge for identifying pressure differential between said first terminal end and said second terminal end and wherein said first terminal end is adapted to be received in said flue pipe and said second terminal end is opened to the environment of said flue pipe;
said pair of legs being secured to said mounting plate, said second leg being secured with a spring clip, and said first leg having an arcuate intermediate portion extending through said mounting plate at a first leg receiving slot.

4. The manometer of claim 3 wherein said mounting plate includes a normal protrusion near said spring clip abutting said second terminal end and said first leg receiving slot is disposed for abutting engagement with said arcuate intermediate portion whereby said legs are confined against said mounting plate.

5. The manometer as claimed in claim 3 wherein said arcuate intermediate portion comprises a generally ninety degree bend in said first leg depending toward a generally straight terminal end portion for reception in said flue pipe.

6. A fluid for reception in an open-ended manometer essentially consisting of ninety-three to ninety-seven percent propylene glycol and three to seven percent water.

7. A fluid as claimed in claim 6 including a trace of dye material.

8. A draft gauge for identifying pressure differential comprising a first and a second open-ended leg having a cross-sectional internal diameter falling within the range of 0.190 inches to 0.250 inches, each of said legs having an incline angle of at least five degrees;
a mounting plate including a meniscus registry securely attached to said first and said second legs;
said first and said second legs containing a fluid essentially consisting of ninety-three to ninety-seven percent propylene glycol and three to seven percent water.

9. The draft gauge as defined in claim 8 wherein said fluid includes a trace of dye material.

10. A draft gauge including a selectively adjustable leveling mechanism comprising:
a mounting member for securely confining a pair of manometer legs in a selected position including a meniscus registry having fluid leveling indicators;
a support bracket for supporting said mounting member, said mounting member being selectively adjustable relative to said subject bracket with said leveling mechanism, said leveling mechanism including a first bracket portion securely fastened to a first wall containing a first draft ambiance, a second bracket portion securely fastened to said first bracket portion and fastened to said mounting member with selectively adjustable fasteners comprising a first threaded fastener received in a first closely-confining receiving aperture of said mounting member and a first closely-confining receiving aperture of said second bracket portion, and a second threaded fastener received in a loosely-confining slot of said mounting member and a second closely-confining receiving aperture of said second bracket portion whereby said mounting member and said pair may be selectively leveled by loosening said first and said second threaded fastener, adjusting said mounting member in a pivoting movement about said first threaded fastener to a level position indicated by said leveling indicators and tightening said first and said second threaded fasteners.

11. A manometer draft gauge for gauging the draft of a flue pipe comprising:
a first and a second open-ended legs integrally joined at a mid-point nadir, said nadir including a recess, said legs having a cross-sectional internal diameter falling within the range of 0.190 inches to 0.250 inches, and each of said legs having an incline angle of 4.5° or more,
a leg mounting plate including a meniscii registry and leveling indicators, a limiting projection for abutting a terminal end of said second leg, a receiving slot for receiving an arcuate intermediate end portion of said first leg disposed relative to said projection for movement limiting abuttment of said legs;
a support bracket assembly including a first bracket portion for secure mounting to said flue pipe and including an aperture for communicating said first leg to said flue pipe, said first leg terminal end extending through said aperture, a second bracket portion secured to said first bracket portion and selectively adjustably fastened to said mounting plate for selective leveling of said mounting plate and meniscii; and
said legs containing a fluid whereby said draft gauge may be employed to measure differential pressure between said flue pipe and said flue pipe environment.

* * * * *